(12) United States Patent
Wang et al.

(10) Patent No.: US 8,965,082 B2
(45) Date of Patent: Feb. 24, 2015

(54) SYSTEMS AND METHODS FOR ALIGNING MULTIPLE SECTIONS OF IMAGING DATA

(75) Inventors: Sharon X. Wang, Highland Heights, OH (US); Thomas Laurence, North Royalton, OH (US); David Sowards-Emmerd, Sunnyvale, CA (US)

(73) Assignee: Koninklijke Philips N.V., Eindhoven (NL)

( * ) Notice: Subject to any disclaimer, the term of this patent is extended or adjusted under 35 U.S.C. 154(b) by 376 days.

(21) Appl. No.: 13/511,676

(22) PCT Filed: Nov. 18, 2010

(86) PCT No.: PCT/IB2010/055273
§ 371 (c)(1),
(2), (4) Date: May 24, 2012

(87) PCT Pub. No.: WO2011/073824
PCT Pub. Date: Jun. 23, 2011

(65) Prior Publication Data
US 2012/0288177 A1    Nov. 15, 2012

Related U.S. Application Data

(60) Provisional application No. 61/287,922, filed on Dec. 18, 2009.

(51) Int. Cl.
G06K 9/00    (2006.01)
G06T 7/00    (2006.01)
G06T 11/00   (2006.01)

(52) U.S. Cl.
CPC ............. *G06T 7/0026* (2013.01); *G06T 11/008* (2013.01); *G06T 2200/32* (2013.01); *G06T 2207/10081* (2013.01); *G06T 2207/10088* (2013.01)
USPC .......................................................... 382/128

(58) Field of Classification Search
None
See application file for complete search history.

(56) References Cited

U.S. PATENT DOCUMENTS

| | | | |
|---|---|---|---|
| 2005/0261577 A1* | 11/2005 | Ficaro et al. .................. | 600/425 |
| 2007/0176087 A1* | 8/2007 | Wang et al. ................. | 250/252.1 |
| 2008/0246768 A1* | 10/2008 | Murray et al. ................ | 345/427 |
| 2012/0235998 A1* | 9/2012 | Smith-Casem et al. ...... | 345/424 |
| 2012/0288177 A1* | 11/2012 | Wang et al. ................... | 382/131 |

OTHER PUBLICATIONS

Hu, H.; Multi-slice helical CT: Scan and reconstruction; 1999; Med. Phys.; 26(1)5-18.

(Continued)

*Primary Examiner* — Tahmina Ansari

(57) ABSTRACT

A method of aligning multiple volumetric sections of imaging data is provided. The method comprises aligning a primary volumetric section and a secondary volumetric section which is adjacent to the primary volumetric imaging section, for moving the secondary volumetric section into alignment with the primary volumetric section. A related apparatus for performing the method is also provided.

20 Claims, 6 Drawing Sheets

(56) References Cited

OTHER PUBLICATIONS

Krinidis, S., et al.; A Global Energy Function for the Alignment of Serially Acquired Slices; 2003; IEEE Trans. on Information Technology in Biomedicine; 7(2)108-113.

Maas, L. C., et al.; Decoupled Automated Rotational and Translational Registration for Functional MRI Time Series Data: The DART Registration Algorithm; 1997; MRM; 37:131-139.

Wachinger, C., et al.; Registration Strategies and Similarity Measures for Three-dimensional Ultrasound Mosaicing; 2008; Acad. Radiol.; 15:1404-1415.

Wachinger, C., et al.; Deformable Mosaicing for Whole-Body MRI; 2008; Medical Image Computing and Computer-Assisted Intervention: Lecture Notes in Computer Science; pp. 113-121.

* cited by examiner

SYSTEMS AND METHODS FOR ALIGNING MULTIPLE SECTIONS OF IMAGING DATA

CROSS REFERENCE TO RELATED APPLICATIONS

This application claims the benefit of U.S. provisional application Ser. No. 61/287,922 filed Dec. 18, 2009, which is incorporated herein by reference.

The present application relates generally to the imaging arts and more particularly to aligning multiple volumetric sections of imaging data to eliminate artifacts while maintaining geometrical accuracy. The application subject matter finds particular use with x-ray based imaging systems, especially computed tomography (CT) imaging systems, and will be described with particular reference thereto. However, it could also be used in connection with other imaging systems, such as single-photon emission computed tomography (SPECT) or positron emission tomography (PET) imaging systems.

According to one aspect of the present invention, a method of aligning multiple volumetric sections of imaging data is provided. The method comprises choosing a primary volumetric section and a secondary volumetric section which is adjacent to the primary volumetric imaging section, for moving the secondary volumetric section into alignment with the primary volumetric section. Then one or more z-axis alignment parameters and x,y-axis parameters are determined for shifting a position of the secondary volumetric section to align the secondary volumetric section with the primary volumetric section. A related apparatus for performing the method is also provided.

There are many volume data alignment algorithms available, each of which is suitable for particular applications. In one application the method of the present invention may be used in connection with the CT component of a combined SPECT/CT or PET/CT imaging system so that the final CT image coordinate system is consistent with the CT coordinates used for the SPECT/CT or PET/CT registration. The final CT image can then easily be registered with the SPECT or PET imaging data, to generate localization and attenuation correction coefficients. In another beneficial application of the present invention, volumetric sections of imaging data may be aligned contemporaneously with the imaging data acquisition, thus reducing the overall amount of time required to generate a final image and efficiently using computing and storage resources. Moreover, the present invention is robust and can give accurate results even when the imaged person or object shifts position on top of the imaging table during the imaging acquisition.

Numerous additional advantages and benefits will become apparent to those of ordinary skill in the art upon reading the following detailed description of the preferred embodiments. The invention may take form in various components and arrangements of components, and in various process operations and arrangements of process operations. The drawings are only for the purpose of illustrating preferred embodiments and are not to be construed as limiting the invention.

Figure 5A:
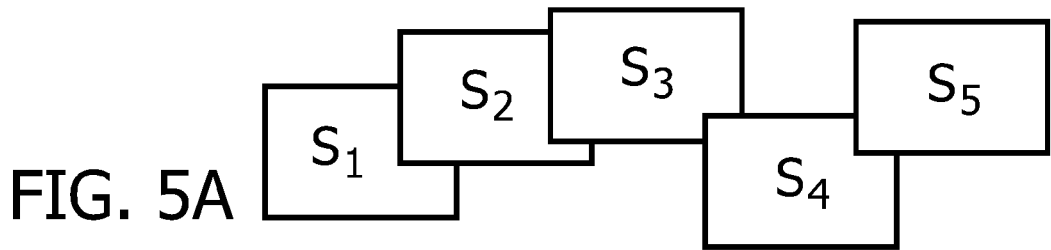
Figure 5B:
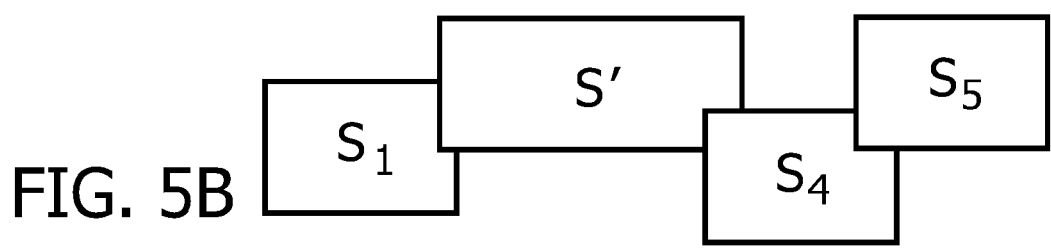
Figure 5C:
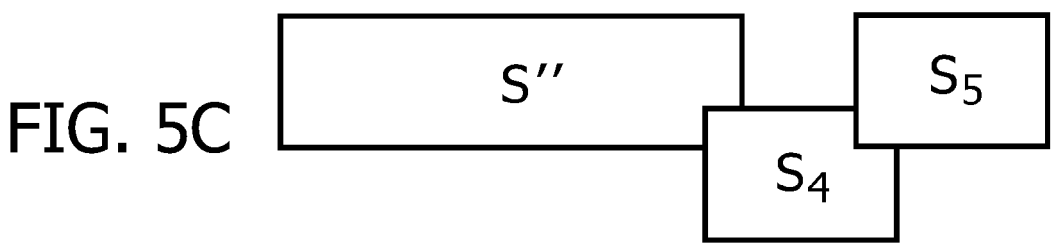
Figure 5D:
Figure 5E:
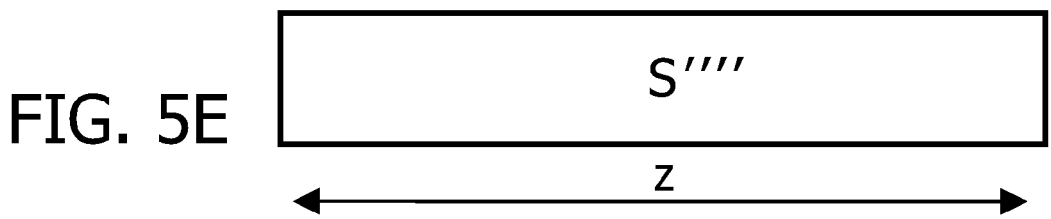
Figure 6A:
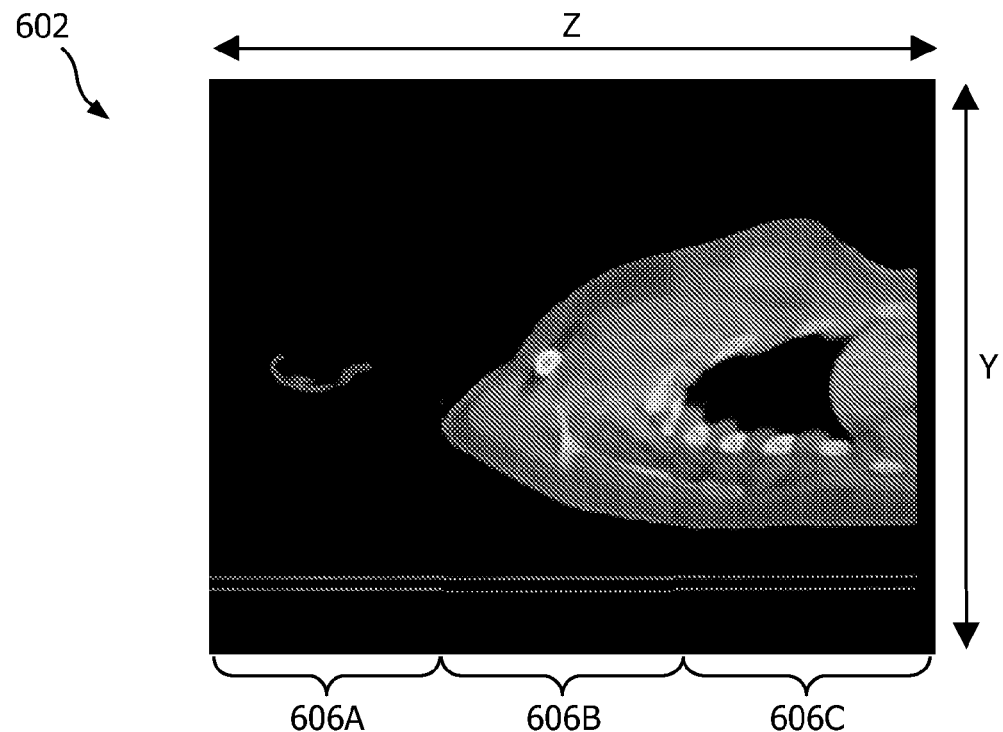
Figure 6B:
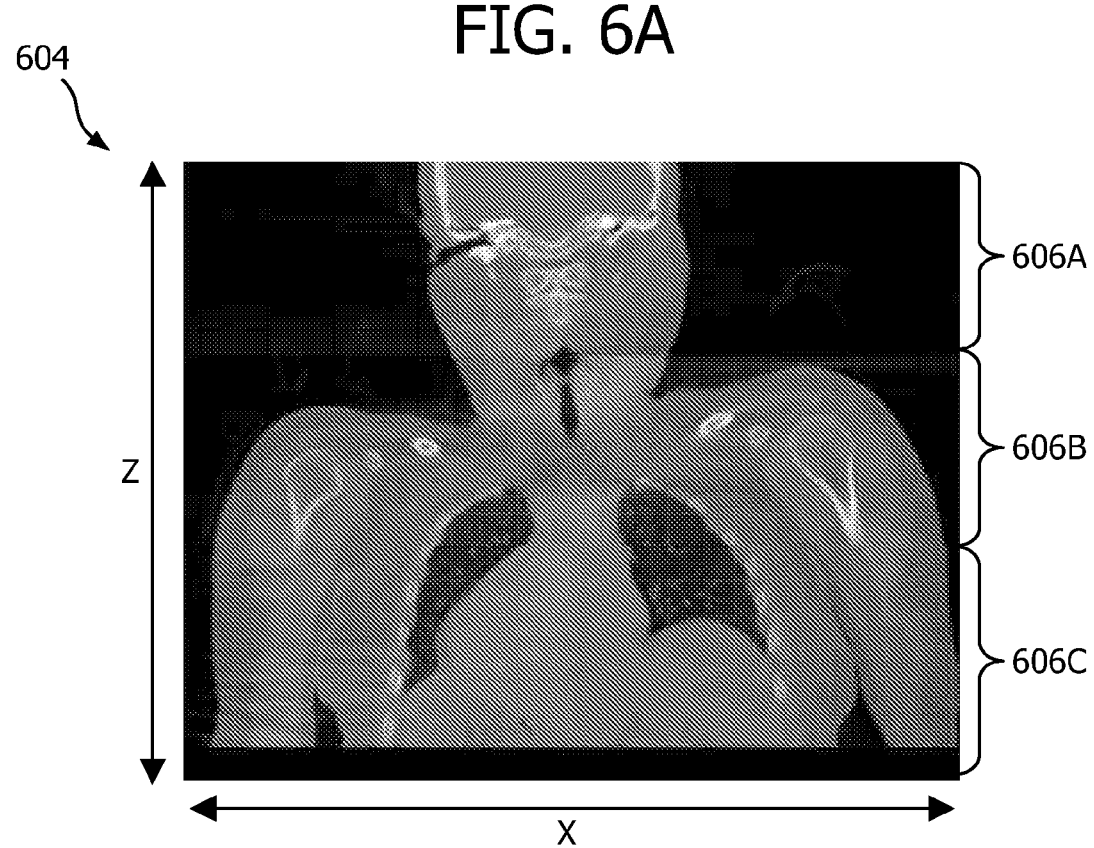

FIGS. 4A through 4E schematically illustrate aligning five different volumetric sections $S_1$ through $S_5$, extending from one end of the imaging data and propagating in one direction through the entire set of imaging data;

FIGS. 5A through 5E schematically illustrate aligning five different volumetric sections $S_1$ through $S_5$, extending from a center section and propagating in two opposite directions through the entire set of imaging data; and FIGS. 6A and 6B are respectively a side view and a top view of a CT image made by combining three different volumetric sections and aligning the sections to remove imaging artifacts.

The medical imaging system and apparatus of the present application is generally any medical imaging system, for example, a CT, SPECT or PET imaging system. More specifically, with reference to FIG. 1, in an exemplary embodiment the medical imaging system 100 is a CT imaging system. A CT imaging acquisition system 102 includes a gantry 104 and a table 106 which moves along the z-axis. A patient or other object to be imaged (not shown) lies down on the table 106 and is moved to be disposed within an aperture 108 in the gantry 104. Once the patient or object is in position, an x-ray source 110 emits a projection of x-rays to be gathered by an x-ray data measurement system 112 inside the gantry 104. (A portion 114 of the gantry 104 is cut away in FIG. 1 to show the x-ray source 110 and x-ray data measurement system 112 which are housed inside the gantry 104.) The data measurement system 112 includes several photodetectors 116 disposed on a cradle 118. The x-ray source 110 and data measurement system 112 rotate together around the aperture 108 to record CT imaging data from various positions. In some embodiments such rotation may occur while the table 106 is stationary, in other embodiments such rotation may occur in conjunction with linear movement of the table 106 along the z-axis in a "helical" scan. The rotation is possible because the x-ray source 110 and the cradle 118 are each mounted to a common rotor (not shown) inside the gantry 104.

The CT imaging acquisition system 102 then passes the CT imaging data on to a CT imaging, processing and display system 120 through a communication link 101. Although the systems 102 and 120 are shown and described here as being separate systems for purposes of illustration, they may in other embodiments be part of a single system. The CT imaging data passes to an image processor 122 which stores the data in a memory 124. The image processor 122 electronically processes the CT imaging data to generate images of the imaged patient or other object. The image processor 122 can show the resulting images on an associated display 126. A user input 128 such as a keyboard and/or mouse device may be provided for a user to control the processor 122.

Thus the aforementioned functions can be performed as software logic. "Logic," as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory such as memory 124, part of an operating system or other type of executable instructions. It will be appreciated by one of ordinary skill in the art that the form of software is dependent on, for example, requirements of a desired application, the environment it runs on, and/or the desires of a designer/programmer or the like.

The systems and methods described herein can be implemented on a variety of platforms including, for example, networked control systems and stand-alone control systems. Additionally, the logic shown and described herein preferably resides in or on a computer readable medium such as the memory 124. Examples of different computer readable media include Flash Memory, Read-Only Memory (ROM), Random-Access Memory (RAM), programmable read-only memory (PROM), electrically programmable read-only memory (EPROM), electrically erasable programmable read-only memory (EEPROM), magnetic disk or tape, optically readable mediums including CD-ROM and DVD-ROM, and others. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated, and/or re-organized in their implementation as warranted or desired.

Figure 1:
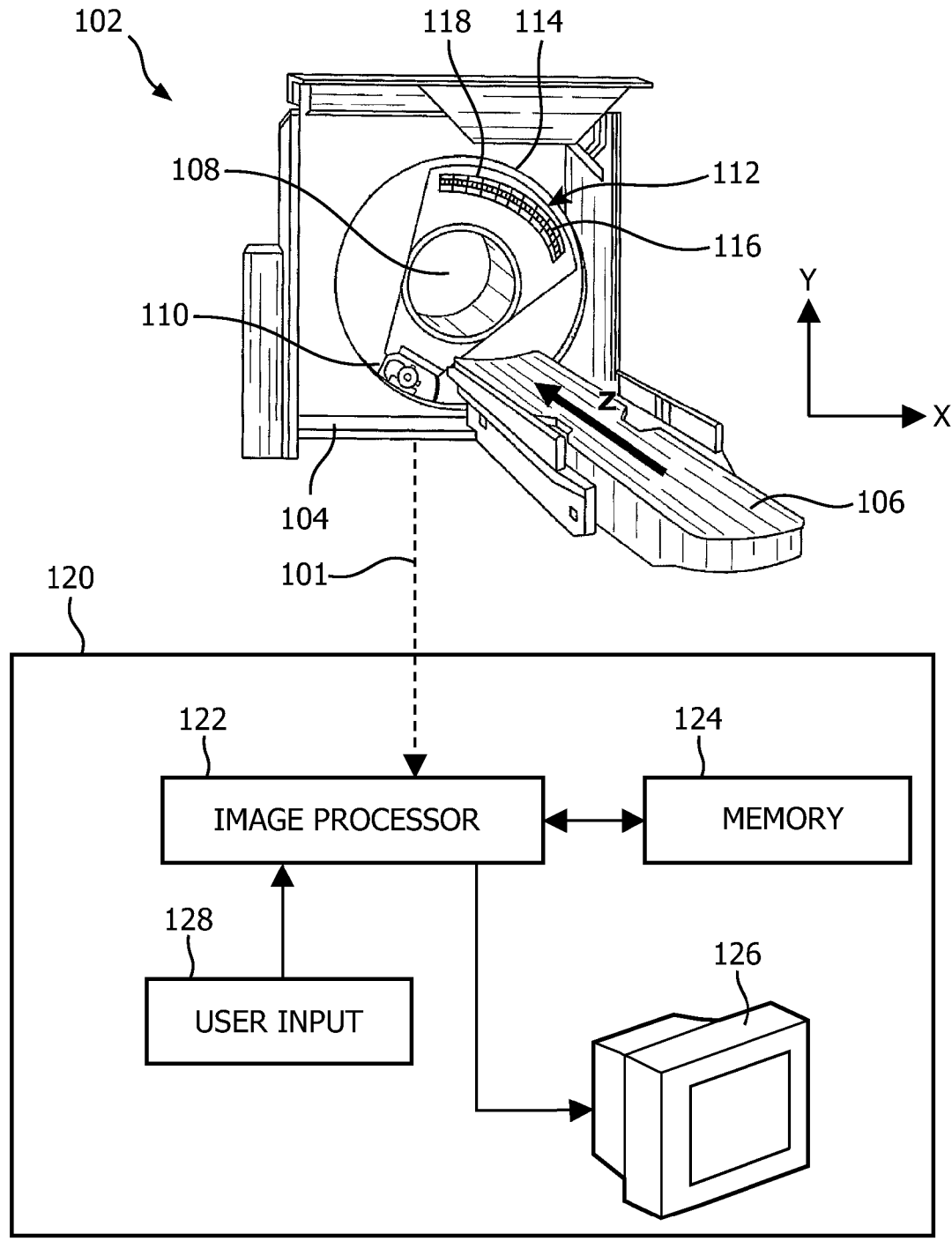
FIG. 1 is an exemplary CT imaging system, with a portion of the stationary gantry cut away to reveal the rotating gantry, x-ray source and data measurement system.

The imaging system 100 may be a stand-alone unit which provides only CT-based imaging, as is shown in FIG. 1. Although not shown in the Figures, the imaging system 100 may additionally include appropriate components for PET and/or SPECT imaging, or some other kind(s) of imaging modality, in conjunction with the CT-based imaging components.

Figure 2A:
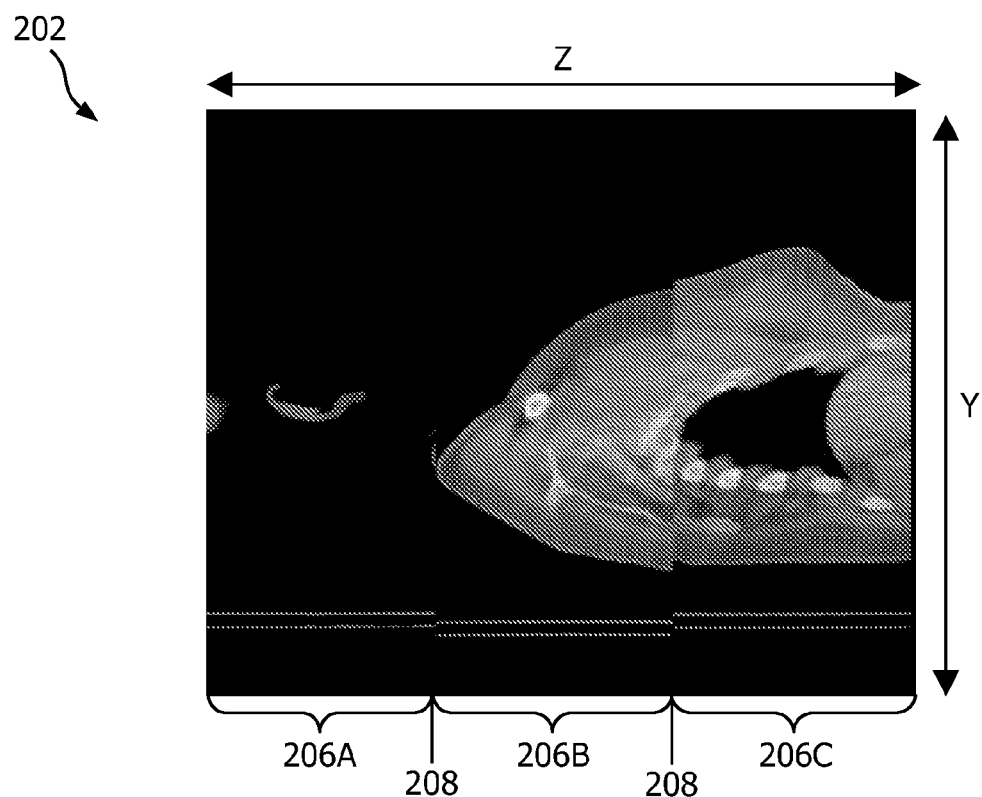
FIGS. 2A and 2B are respectively a side view and a top view of a CT image made by combining three different volumetric sections without removal of the resulting artifacts.
Figure 2B:
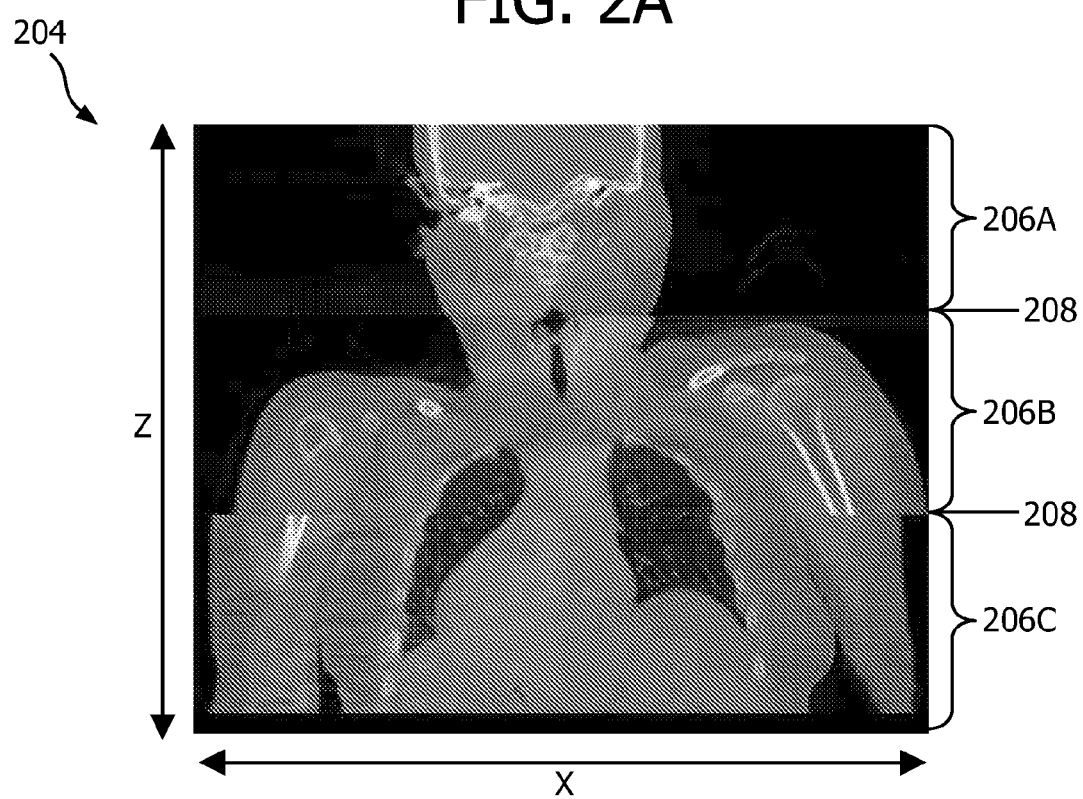

Regardless of the imaging modality employed, whether CT, SPECT, PET, or some other modality, or combinations thereof, the imaging data gathered by the imaging system may be recorded in separate volumetric imaging sections along the longitudinal z-axis of FIG. 1. Adjacent volumetric imaging sections may or may not overlap one another to some extent. The separate volumetric imaging sections may be combined together to form one complete image of the person or object being imaged. This is shown for example in FIGS. 2A and 2B. FIG. 2A is a CT image comprising a side view 202 of a person, whereas FIG. 2B is a CT image comprising a top view 204 of the same person. The images 202 and 204 each resulted from the combination of three separate volumetric sections 206A, 206B and 206C along the longitudinal z-axis of the person being imaged. As can be seen in the images 202 and 204, the three separate sections 206A, 206B and 206C have not been properly aligned. This causes imaging artifacts 208 to appear at the borderline and/or overlapping areas between adjacent volumetric sections 206 of imaging data.

Any type of imaging acquisition may be performed to generate the separate volumetric sections 206 of imaging data, but in a preferred embodiment, a step-and-shoot imaging acquisition is performed to generate each section 206. In a step-and-shoot imaging acquisition, the table 106 remains stationary while the x-ray source 110 and x-ray data measurement system 112 rotate around the table 106 in discrete rotational intervals or "steps", then they stop to record imaging data or "shoot" at each step. In a particularly preferred embodiment, the extent of each volumetric section 206 along the z-axis is equal to the effective imaging width of the x-ray data measurement system 112 along the z-axis. In that case, each section 206 results from one rotational step-and-shoot spin around the table 110. A step-and-shoot acquisition is particularly useful in connection with x-ray data measurement systems 112 which are flat panel x-ray detectors. If the object to be imaged is too long to be encompassed by the width of the data measurement system 112 along the z-axis, however, the step-and-shoot imaging acquisition naturally results in multiple volumetric sections 206 which must then be combined to form a complete image. That process introduces the sectional misalignment artifacts at the borderlines/overlaps between adjacent sections, which are shown at 208 in FIGS. 2A and 2B.

Figure 3:
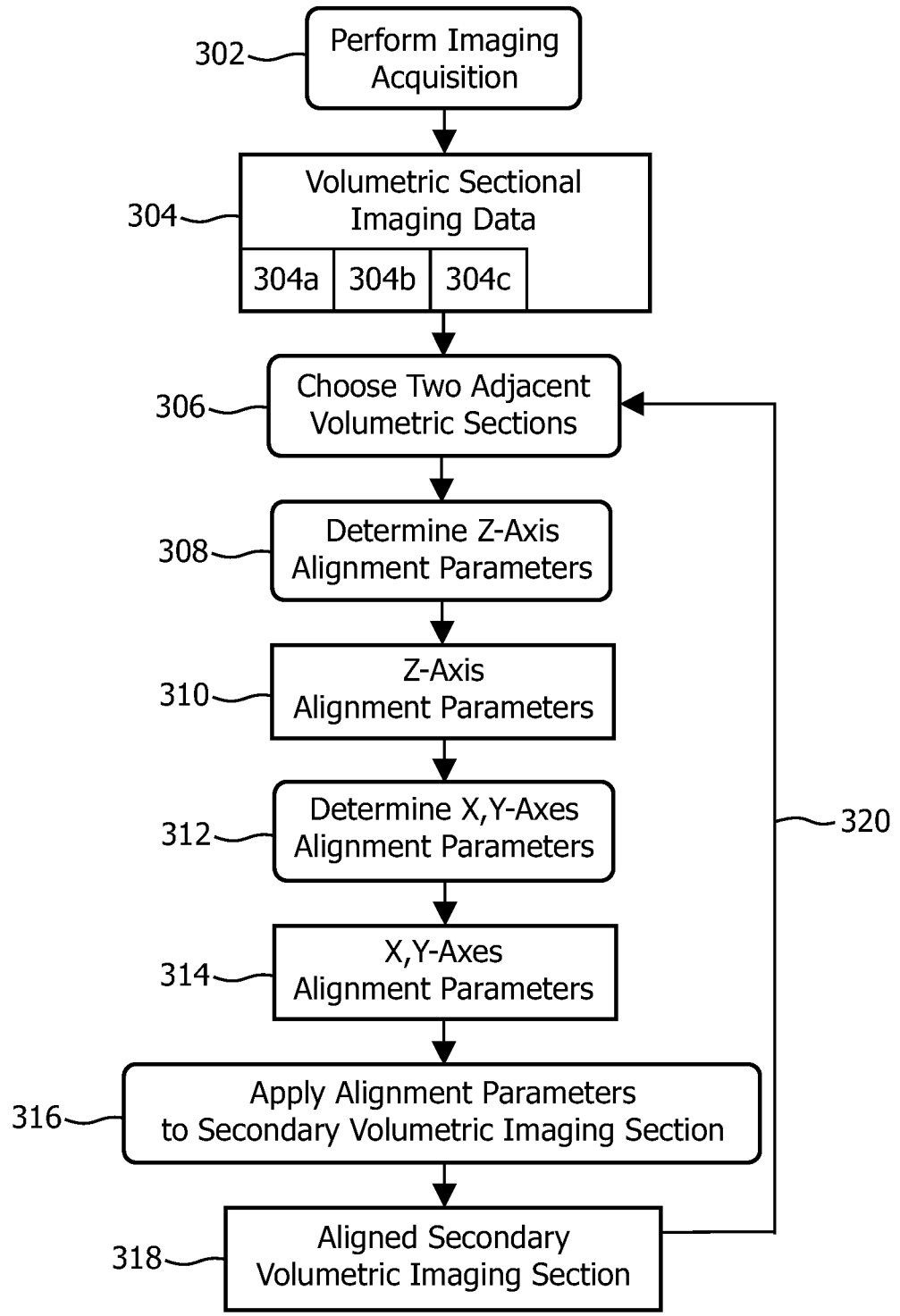
FIG. 3 illustrates an exemplary method of aligning multiple volumetric sections of imaging data to remove artifacts.

Therefore, the present disclosure concerns an image based method 300 that eliminates the artifacts, as shown for example in FIG. 3. In step 302, an imaging acquisition is performed to generate volumetric sectional imaging data 304. For example, a CT imaging system 100 may be utilized to generate volumetric sectional CT imaging data 304. The data 304 includes at least two separate volumetric sections 304 $a$, 304 $b$, 304 $c$, etc. of imaging data. In a representative example, each volumetric section of imaging data comprises an x, y, z matrix of 512×512×202 imaging voxels, with an isotropic voxel size of 1 mm$^3$. The x, y, z axes for such a matrix are identified in FIGS. 1, 2A and 2B. In that representative example, the method 300 results in a final image having a size of 512×512×(202)(V) voxels, with an isotropic voxel size of 1 mm$^3$, where V is the number of volumetric sections making up the entire volumetric sectional data 304.

In step 306, two adjacent volumetric sections are chosen for alignment: a primary section and a secondary section. In a convenient implementation of the method, the primary volumetric section corresponds to the first imaging section 304$a$ and the secondary volumetric section corresponds to the second imaging section 304$b$. Due to mechanical errors in recording the positions of the table 106 and/or the rotor supporting the x-ray source 110 and x-ray data measurement system 112 during the imaging scan 302, the z-axis coordinates of the recorded imaging data 304 is often inaccurate by a small amount. Thus, in step 308, a matching filter is applied to align the primary volumetric section and the secondary volumetric section along the z-axis. The result of step 308 may, for example, be a z-alignment parameter 310 representing the distance to shift the secondary volumetric section along the z-axis to properly match the secondary volumetric section with the primary volumetric section.

In one embodiment, the following matching filter algorithm may be employed in step 308. This particular matching filter attempts to match a single imaging slice perpendicular to the z-axis in the primary volumetric section 304$a$ with a corresponding imaging slice perpendicular to the z-axis in the secondary volumetric section 304$b$. The two slices correspond when their imaging intensity maps are similar enough to suggest they are imaging slices of the same portion in the person or object being imaged. Thus, denote the intensity map of the single imaging slice in the primary volumetric section 304$a$ as:

$$f(x,y), (-N/2 \leq x, y \leq N/2), \quad (1)$$

where f is the recorded imaging intensity of the voxel positioned at coordinates x, y in the chosen imaging slice, and N is equal to the total number of voxels along either the x-axis or the y-axis. Then denote the intensity maps of the entire set of imaging slices perpendicular to the z-axis in the secondary volumetric section 304$b$, to be matched to the intensity map of the chosen slice of Equation (1) in the primary volumetric section 304$a$, as:

$$g_i(x,y), (-N/2 \leq x, y \leq N/2), (0 \leq i \leq M), \quad (2)$$

where g is the recorded imaging intensity of the voxel positioned at coordinates x, y in a given imaging slice i perpendicular to the z-axis, and M is the total number of such imaging slices in the secondary volumetric section 304b.

Dividing the Fourier transforms of Equations (1) and (2) gives:

$$H_i(u, v) = \frac{G_i(u, v)}{F(u, v)}, \quad (3)$$

so that a measurement function is defined as the inverse of the Fourier transform:

$$h_i(x,y) = F^{-1}(H_i). \quad (4)$$

The maximum of the measurement function $h_i(x,y)$ indicates which of the imaging slices i in the secondary volumetric section 304b most closely matches the chosen imaging slice in the primary volumetric section 304a. The location of the energy peak represents the shift of the origin $(x_0, y_0)$ of the secondary volumetric section 304b along the z-axis with respect to the primary volumetric second 304a to align them together. That is, the z-alignment parameter 310:

$$\delta_i(x_0, y_0) = \max_i(|h_i(x, y)|) \quad (5)$$

represents the shift along the z-axis of the secondary volumetric section 304b to properly align with the primary volumetric section 304a. One advantage of this particular matching filter algorithm 308 is that it utilizes the high frequency content of the imaging data. It is thus robust with respect to changes in intensity values f and g.

Once the primary and secondary adjacent volumetric sections 304a and 304b have been matched in step 308 to properly overlap along the z-axis, then in step 312, further parameters 314 are determined for aligning the two adjacent volumetric sections 304a and 304b along their respective x, y coordinate axes. For example, the secondary volumetric section 304b may be linearly translated along the x-axis, and/or linearly translated along the y-axis, and/or rotated around the z-axis, to align it with the primary volumetric section 304a.

In one representative embodiment, the alignment 312 may proceed as follows. First, define the x, y axes alignment parameters 314 as:

$$\vec{v} = \{x, y, \theta\} \quad (6)$$

where the x and y values identify the amount of linear translational shifting to be made to the secondary volumetric section 304b along those respective axes, and θ identifies the amount of rotational shifting to be made to the secondary volumetric section 304b around the z-axis, in order to align the two adjacent volumetric sections 304a and 304b along their respective x, y coordinate axes. An error function may then be defined as:

$$e(\vec{v}) = \{g_I(\vec{v}) - f\} \cdot FOV \quad (7)$$

where I is a given imaging slice number i of the secondary volumetric section 304b along the z-axis, and FOV is a circular mask function. The circle of the function FOV is centered on the z-axis with a radius R, and the function FOV is equal to one inside the circle and zero outside the circle. The shift vector v of Equation (6) which provides a minimum value for the error function of Equation (7) will correspond to the amount of shift to be applied to the secondary volumetric section 304b to align it with the primary volumetric section 304a. Such minimization may be determined by any conventional method, such as a least squares method. The minimization may also be accomplished using a simplex method, with the initial values of shift being derived from Equation (5). Those initial values tend to lead to a simplex method result which converges quickly and accurately.

At this point in the exemplary method 300, alignment parameters 310, 314 have been determined for moving the secondary volumetric section 304b to align it with the primary volumetric section 304a. Next, in step 316, the volumetric imaging data 304 for the secondary volumetric section 304b are corrected using bilinear interpolation. That is, the alignment parameters 310, 314 are applied to the data 304b to shift the position of the intensity map g and align it with the primary volumetric section 304a, generating an aligned secondary volumetric imaging section 318. In this algorithm the only information needed from the primary volumetric section 304a is the intensity map f. Implementing this shift of the secondary volumetric imaging section 304b with a first-in-first-out or FIFO buffer can minimize the amount of extra memory storage required for the alignment process.

Next 320 in the exemplary method 300, another two adjacent volumetric sections are chosen for alignment. In a convenient implementation, if the first two primary and secondary volumetric sections were chosen respectively to be the first volumetric imaging section 304a and the second volumetric imaging section 304b, then in this second iteration the primary volumetric section may conveniently be chosen to be the second volumetric imaging section 304b (as aligned after the first iteration) and the secondary volumetric section chosen to be the third volumetric imaging section 304c. In this implementation, the second imaging section 304b remains stationary and alignment parameters 310, 314 are determined for shifting the position of the third imaging section 304c to align it with the position of the second imaging section 304b. Once that is accomplished, the method 300 loops again 320 to align another two adjacent volumetric sections such as the sections 304c and 304d. These iterations 320 continue until all the volumetric imaging sections 304 have properly been aligned to one another.

Figure 4A:
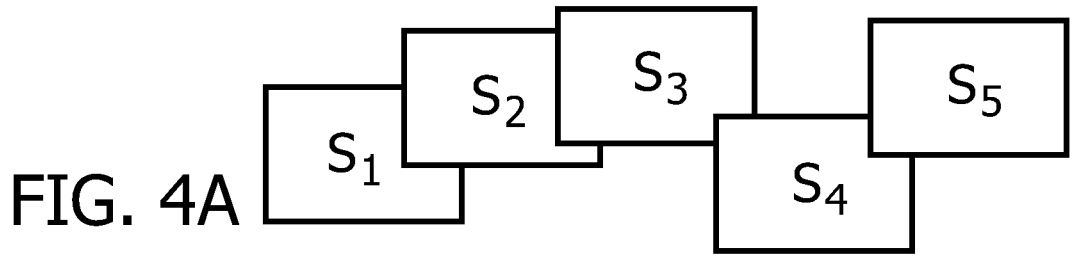
Figure 4B:
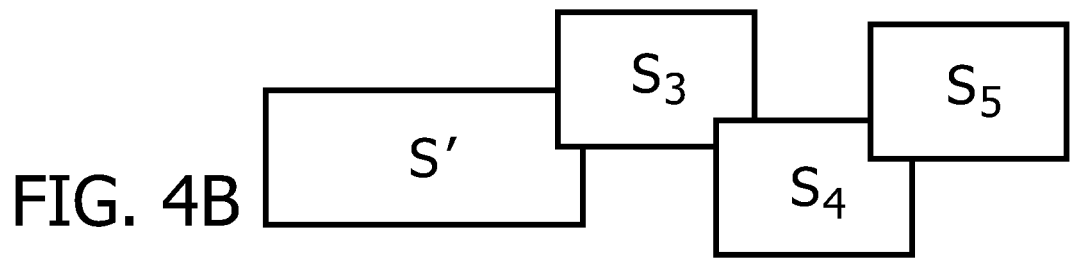
Figure 4C:
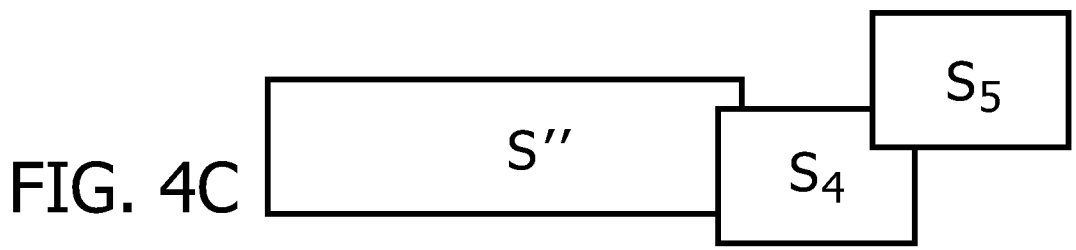
Figure 4D:
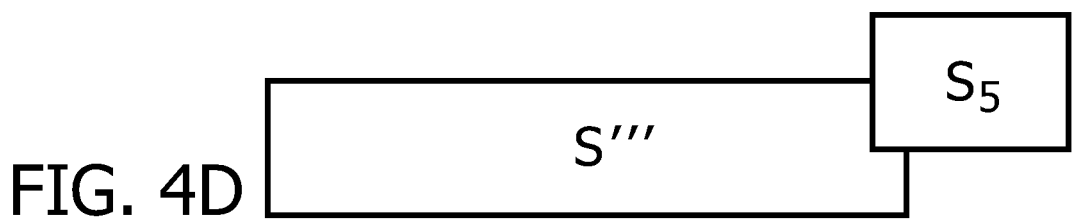
Figure 4E:
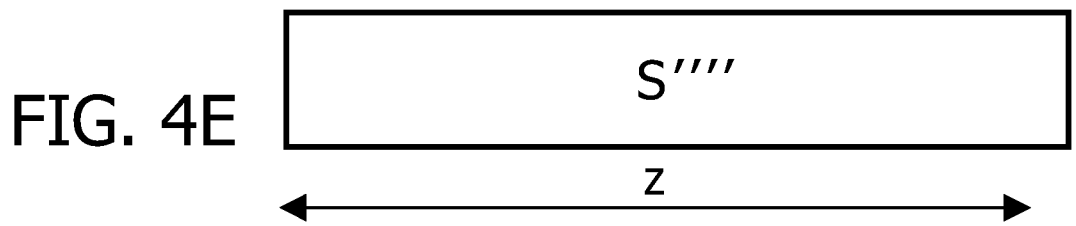

This process is schematically illustrated in FIGS. 4A through 4E, with a representative example of aligning five different volumetric sections $S_1$ through $S_5$. These Figures illustrate a side view of the imaging sections $S_1$ through $S_5$ as the alignment method proceeds. In these Figures the z-axis extends horizontally as shown in FIG. 4E. FIG. 4A represents the lack of alignment between the five sections before the method is applied. After the initial iteration 320 of the method 300, the first two volumetric sections $S_1$ and $S_2$ are aligned to form a combined image S', as shown in FIG. 4B. In the next iteration 320 of the method, the next adjacent volumetric section $S_3$ is aligned with the combined image S' to form another combined image S", as shown in FIG. 4C. In the next iteration 320 of the method, the next adjacent volumetric section $S_4$ is aligned with the combined image S" to form another combined image S'", as shown in FIG. 4D. In the next and final iteration 320 of the method, the next adjacent volumetric section $S_5$ is aligned with the combined image S'" to form another combined image S"", as shown in FIG. 4E.

Bilinear interpolation is an approximate method, so the smaller the displacement to be corrected in an image, the more accurate the final result will be. In the foregoing description, the first two adjacent volumetric sections to be aligned $S_1$ and $S_2$ are at one end of the imaging data, and the alignment algorithm then propagates through the entire imaging data in one direction (to the right in FIGS. 4A through 4E) to align each succeeding adjacent volumetric section. At each step, the primary volumetric section is fixed with a shift vector $v_p=[0,0,0]$, and the secondary volumetric section is then interpolated with a non-fixed shift vector $v_a=[x,y,\theta]$, where the values of x, y and θ are determined to align the two adjacent volumetric sections.

As an alternative example, however, the positions of both the primary and the secondary volumetric sections may be varied in order to align them together. Thus, both shift vectors $v_p$ and $v_a$ may be treated as non-fixed variables, so that both volumetric sections will be interpolated but with a smaller displacement. As a representative example, one may start at the center volumetric section of the imaging data and then follow two changes of alignment propagation, one in each direction extending away from the center volumetric section. Thus, suppose V=5, so that there are five volumetric sections to be aligned, as schematically shown in FIGS. 5A through 5D. Then the absolute displacement for the middle volume, $S_3$, may be defined as:

$$|\{\vec{v}\}_3|=(v_{32}-v_{43})/2 \quad (8)$$

where $v_{ji}$ represents the displacement of volume j relative to volume i. Then there will be two chains of displacement propagation, $S_3$ to $S_2$ to $S_1$ as shown in FIGS. 5B and 5C, and $S_3$ to $S_4$ to $S_5$, as shown in FIGS. 5D and 5E. In this way all five volumetric sections $S_1$ through $S_5$ will get the necessary minimum corrections, starting at the center of the image and moving out to the ends. This will likely reduce the absolute displacement of each volumetric section as compared with starting at one end and moving forward in one direction through the entire imaging set. Such minimization of the absolute displacements may improve the results of the bilinear interpolation alignment.

Examples of the aligned images which result from applying an alignment method such as the method 300 are shown in FIGS. 6A and 6B. FIG. 6A is a CT image comprising a side view 602 of a person, whereas FIG. 6B is a CT image comprising a top view 604 of the same person. The images 602 and 604 each resulted from the combination of three separate volumetric sections 606A, 606B and 606C along the longitudinal z-axis of the person being imaged. As can be seen in the images 602 and 604, the three separate sections 606A, 606B and 606C have been properly aligned to avoid the artifacts which are present in the images of FIGS. 2A and 2B.

The sectional imaging algorithm 300 described here may advantageously be implemented in conjunction with the imaging acquisition 302 itself, to reduce the overall amount of time required to generate a final image and efficiently use computing and memory storage resources. The method 300 may alternatively be implemented only after all the imaging data 304 have been acquired, and in some circumstances this may provide a better result.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof. The invention may take form in various chemical compositions, components and arrangements, combinations and sub-combinations of the elements of the disclosed embodiments.

The invention claimed is:

1. A method of aligning multiple volumetric sections of imaging data comprising the steps of:
choosing a primary volumetric section and a secondary volumetric section which is adjacent to the primary volumetric imaging section, for moving the secondary volumetric section into alignment with the primary volumetric section;
determining one or more z-axis alignment parameters for shifting a position of the secondary volumetric section in a z-axis direction to align the secondary volumetric section with the primary volumetric section along the z-axis direction;
determining one or more x,y-axis alignment parameters for shifting a position of the secondary volumetric section along an x-axis direction and a y-axis direction to align the secondary volumetric section with the primary volumetric section along the x-axis direction and the y-axis direction;
applying the one or more z-axis parameters and the one or more x,y-axis parameters to shift a position of the secondary volumetric section to adjacently align it with the first volumetric section.

2. The method of claim 1, wherein the positions of both the primary volumetric section and the secondary volumetric section may be moved during the alignment process.

3. The method of claim 1, wherein the position of the secondary volumetric section may be moved during the alignment process, and the position of the primary volumetric section is fixed during the alignment process.

4. The method of claim 1, wherein there are V volumetric sections aligned along the z-axis direction in consecutive order from a first volumetric section $S_1$ at a first end of the z-axis up through a last volumetric section $S_V$ at a second end of the z-axis opposite the first end, and V is equal to or greater than three, the method further comprising:
first aligning the first volumetric section $S_1$ with the second volumetric section $S_2$, then aligning the second volumetric section $S_2$ with the third volumetric section $S_3$, and continuing to align adjacent sections together in a one direction propagation along the z-axis direction until each imaging section S has been aligned with its adjacent imaging sections.

5. The method of claim 1, wherein there are V volumetric sections aligned along the z-axis in consecutive order from a first volumetric section $S_1$ at a first end of the z-axis up through a last volumetric section $S_V$ at a second end of the z-axis opposite the first end, and V is equal to or greater than three, the method further comprising:
choosing an initial volumetric section between the first volumetric section $S_1$ and the last volumetric section $S_V$ and aligning the initial volumetric section with another volumetric section adjacent to the initial volumetric section in a first direction along the z-axis toward the first end, and continuing to successively align adjacent volumetric sections proceeding in the first direction until the first volumetric section $S_1$ is aligned;
then aligning the initial volumetric section with another volumetric section adjacent to the initial volumetric section in a second direction along the z-axis toward the second end, and continuing to successively align adjacent volumetric sections proceeding in the second direction until the last volumetric section $S_V$ is aligned.

6. The method of claim 4 further comprising using a bilinear interpolation method.

7. The method of claim 1, wherein determining one or more z-axis alignment parameters comprises choosing a primary imaging slice in the primary volumetric section, such that the primary imaging slice is perpendicular to a z-axis, and wherein the secondary volumetric section comprises multiple secondary imaging slices which are perpendicular to the z-axis, the method further comprising:

comparing each of the multiple secondary imaging slices with the primary imaging slice to evaluate which of the multiple secondary imaging slices best matches the primary imaging slice.

8. The method of claim 1, wherein determining one or more x,y-axis alignment parameters comprises defining a shift vector having a first value corresponding to a linear translational shift along the x-axis direction, a second value corresponding to a linear translational shift along the y-axis direction, and a third value corresponding to a rotational shift around the z-axis.

9. The method of claim 8, wherein determining one or more x,y-axis alignment parameters further comprises defining an error function which depends upon the shift vector, and evaluating the error function for a maximal or minimal value based on changes in the shift vector to determine the first value, the second value and the third value which are used in shifting the position of the secondary volumetric section to align it with the primary volumetric section.

10. The method of claim 9 wherein the error function further depends on a circular mask function.

11. The method of claim 9, wherein the maximal or minimal value is determined by using a least squares method, or a simplex method, or a combination of a least squares method and a simplex method.

12. An imaging, processing and display system for aligning multiple volumetric sections of imaging data, the system comprising:
  an image processor for processing imaging data and a memory for storing imaging data, wherein the image processor executes logic to:
    choose a primary volumetric section and a secondary volumetric section which is adjacent to the primary volumetric imaging section, for moving the secondary volumetric section into alignment with the primary volumetric section;
    determine one or more z-axis alignment parameters for shifting a position of the secondary volumetric section in a z-axis direction to align the secondary volumetric section with the primary volumetric section along the z-axis direction;
    determine one or more x,y-axis alignment parameters for shifting a position of the secondary volumetric section along an x-axis direction and a y-axis direction to align the secondary volumetric section with the primary volumetric section along the x-axis direction and the y-axis direction; and
    apply the one or more z-axis parameters and the one or more x,y-axis parameters to shift a position of the secondary volumetric section to adjacently align it with the first volumetric section.

13. The system of claim 12, wherein there are V volumetric sections aligned along the z-axis direction in consecutive order from a first volumetric section $S_1$ at a first end of the z-axis up through a last volumetric section $S_V$ at a second end of the z-axis opposite the first end, and V is equal to or greater than three, the system further comprising logic to:
  first align the first volumetric section $S_1$ with the second volumetric section $S_2$, then align the second volumetric section $S_2$ with the third volumetric section $S_3$, and to continue aligning adjacent sections together in a one direction propagation along the z-axis direction until each imaging section S has been aligned with its adjacent imaging sections.

14. The system of claim 12, wherein there are V volumetric sections aligned along the z-axis in consecutive order from a first volumetric section $S_1$ at a first end of the z-axis up through a last volumetric section $S_V$ at a second end of the z-axis opposite the first end, and V is equal to or greater than three, the system further comprising logic to:
  choose an initial volumetric section between the first volumetric section $S_1$ and the last volumetric section $S_V$, and align the initial volumetric section with another volumetric section adjacent to the initial volumetric section in a first direction along the z-axis toward the first end, and continue to successively align adjacent volumetric sections proceeding in the first direction until the first volumetric section $S_1$ is aligned;
  then align the initial volumetric section with another volumetric section adjacent to the initial volumetric section in a second direction along the z-axis toward the second end, and continue to successively align adjacent volumetric sections proceeding in the second direction until the last volumetric section $S_V$ is aligned.

15. The system of claim 12, wherein determining one or more z-axis alignment parameters comprises choosing a primary imaging slice in the primary volumetric section, such that the primary imaging slice is perpendicular to a z-axis, and wherein the secondary volumetric section comprises multiple secondary imaging slices which are perpendicular to the z-axis, the system further comprising logic to:
  compare each of the multiple secondary imaging slices with the primary imaging slice to evaluate which of the multiple secondary imaging slices best matches the primary imaging slice.

16. The system of claim 12, wherein determining one or more x,y-axis alignment parameters comprises defining a shift vector having a first value corresponding to a linear translational shift along the x-axis direction, a second value corresponding to a linear translational shift along the y-axis direction, and a third value corresponding to a rotational shift around the z-axis.

17. The system of claim 16, wherein determining one or more x,y-axis alignment parameters further comprises defining an error function which depends upon the shift vector, and evaluating the error function for a maximal or minimal value based on changes in the shift vector to determine the first value, the second value and the third value which are used in shifting the position of the secondary volumetric section to align it with the primary volumetric section.

18. The system of claim 17 wherein the error function further depends on a circular mask function.

19. The system of claim 12, further comprising a CT imaging system combined with a SPECT imaging system or a nuclear medicine imaging system.

20. A method of aligning a primary volumetric section of imaging data with a secondary volumetric section of imaging data, the method comprising the steps of:
  determining one or more z-axis alignment parameters for shifting a position of the secondary volumetric section in a z-axis direction to align the secondary volumetric section with the primary volumetric section along the z-axis direction;
  determining one or more x,y-axis alignment parameters for shifting a position of the secondary volumetric section along an x-axis direction and a y-axis direction to align the secondary volumetric section with the primary volumetric section along the x-axis direction and the y-axis direction;
  applying the one or more z-axis parameters and the one or more x,y-axis parameters to shift a position of the secondary volumetric section to adjacently align it with the first volumetric section.

* * * * *